(12) United States Patent
Wang et al.

(10) Patent No.: US 8,285,323 B2
(45) Date of Patent: Oct. 9, 2012

(54) COMMUNICATION DEVICE AND METHOD FOR INPUT INTERFACE AUTO-LOCK THEREOF

(75) Inventors: Yi-Hua Wang, Taoyuan County (TW); Yih-Feng Kao, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 696 days.

(21) Appl. No.: 12/337,565

(22) Filed: Dec. 17, 2008

(65) Prior Publication Data

US 2009/0170553 A1 Jul. 2, 2009

(30) Foreign Application Priority Data

Dec. 26, 2007 (TW) ................................ 96150338 A

(51) Int. Cl.
*H04M 1/00* (2006.01)
(52) U.S. Cl. ................ 455/550.1; 455/410; 455/116; 455/566; 379/433.04
(58) Field of Classification Search .............. 455/410, 455/116, 550.1, 566; 379/433.04
See application file for complete search history.

(56) References Cited

U.S. PATENT DOCUMENTS

| | | | | |
|---|---|---|---|---|
| 4,119,797 A | * | 10/1978 | Wollert | 381/110 |
| 7,603,143 B2 | * | 10/2009 | Kang et al. | 455/566 |
| 7,869,768 B1 | * | 1/2011 | Vishlitzky | 455/67.13 |
| 2005/0130711 A1 | * | 6/2005 | Kang et al. | 455/570 |
| 2008/0159547 A1 | * | 7/2008 | Schuler et al. | 381/56 |
| 2008/0290985 A1 | * | 11/2008 | Vogedes et al. | 340/3.1 |

FOREIGN PATENT DOCUMENTS

| | | |
|---|---|---|
| EP | 1076442 | 2/2001 |
| EP | 1838075 | 9/2007 |
| GB | 2346500 | 8/2000 |
| TW | I246303 | 12/2005 |

OTHER PUBLICATIONS

"Search Report of European counterpart application", issued on Apr. 1, 2009, p. 1-p. 7.
"Office Action of Taiwan Counterpart Application", issued on Apr. 28, 2011, p. 1-p. 5.
"1st Office Action of China Counterpart Application", issued on Dec. 7, 2010, p. 1-p. 8.

* cited by examiner

*Primary Examiner* — Kent Chang
*Assistant Examiner* — Yousef Rod
(74) *Attorney, Agent, or Firm* — Jianq Chyun IP Office

(57) ABSTRACT

A communication device and a method for auto-locking an input interface thereof are provided. In the present invention, an external volume received by the communication device having the input interface is determined when the communication device enters a communication mode. Thereafter, the external volume is compared to a predetermined volume. An input function of the input interface is disabled if the external volume exceeds the predetermined volume. As a result, activation of other functions due to unintended touch of the input interface during a phone call can be avoided.

12 Claims, 3 Drawing Sheets

COMMUNICATION DEVICE AND METHOD FOR INPUT INTERFACE AUTO-LOCK THEREOF

CROSS-REFERENCE TO RELATED APPLICATION

This application claims the priority benefit of Taiwan application serial No. 96150338,, filed on Dec. 26, 2007. The entirety of the above-mentioned patent application is hereby incorporated by reference herein and made a part of this specification.

BACKGROUND OF THE INVENTION

1. Field of the Invention

The present invention relates to a method for auto-locking an input interface. More particularly, the present invention relates to a communication device that can execute such method, and a computer-readable recording medium recording a program used for executing such method.

2. Description of Related Art

With a booming development of a touch sensor technology, more and more electronic devices apply touch screens as display devices thereof to substitute conventional screens. Since the touch screen not only has an image displaying function, but can also serve as an input tool to receive operations of a user, once the touch screen is applied to the electronic device, a space originally used for disposing a keyboard can be saved.

Regarding a handheld device (such as a mobile phone) valuing features of a slim and light-weighted appearance and portability, application of the touch screen gradually becomes a main stream in design. Though it is convenient to operate the mobile phone via the touch screen, when the user makes a phone call through such mobile phone, the user is probably rather closed to the mobile phone for clearly hearing the voice. However, for the current mobile phones having the touch screens in the market, while the user answers a phone call, the touch screen can still be operated via the input tool, which means other icons displayed on the touch screen can be miss-touched by the user to activate other functions, which can lead to interference or even interruption of the phone call.

To avoid the above inconveniences, an additional key is designed by the mobile phone manufacture, by which the user can temporarily disable a touch function of the touch screen. Namely, before the user answers the phone call, such key has to be manually pressed to disable the touch function of the touch screen, so as to avoid unintended touch of the touch screen during the phone call. It is obvious that if the user has to manually disable the touch function each time before answering the phone call, it is not only inconvenient for the operation, but also easily causes a delay for answering the phone call.

SUMMARY OF THE INVENTION

Accordingly, the present invention is directed to an auto-lock method, by which whether an input function of an input interface of a communication device is automatically disabled is determined according to a loudness of an external volume, so as to improve a usage convenience of the communication device.

The present invention is directed to a communication device, which can appropriately disable an input function of an input interface under a communication mode, so as to avoid interruption of a phone call due to unintentionally activate other functions through the input interface by a user.

The present invention is directed to a computer-readable recording medium, in which a stored program can determine whether or not to disable an input function of an input interface by comparing an external volume to a predetermined volume, so as to automatically lock a screen in a communication mode.

The present invention provides an auto-lock method for a communication device having an input interface. The method can be described as follows. First, an external volume received by a communication device is determined when the communication device enters a communication mode. Next, the external volume is compared to a predetermined volume. Wherein, if the external volume reaches the predetermined volume, an input function of the input interface is disabled, so as to lock a screen of the communication device.

In an embodiment of the present invention, the external volume is, for example, a user's volume received when a user performs a phone call in the communication mode. Moreover, the external volume can also be an environmental volume.

In an embodiment of the present invention, after the input function of the input interface is disabled, the method further includes activating the input function of the input interface when an unlock signal is received. The unlock signal can be a signal generated when the user presses a specific key of the communication device, a signal generated when the user presses a specific region on the input interface, or a signal generated when the user performs a specific slide operation on the input interface. The input interface can be a touch screen or a keyboard. Wherein, a type of a key on the keyboard comprises a letter key, a symbol key, a function key and a numeral key.

In an embodiment of the present invention, after the step of comparing the external volume to the predetermined volume, the method further includes continually activating the input function of the input interface if the external volume is less than or equal to the predetermined volume.

In an embodiment of the present invention, the communication device is, for example, a smartphone, a personal digital assistant (PDA) phone, or a touch phone.

The present invention provides a computer-readable recording medium for storing a program, wherein the aforementioned auto-lock method can be executed according to the program.

The present invention provides a communication device including an input interface, a communication module, a volume-receiving module and a processing module. The processing module is connected to the input interface, the communication module and the volume-receiving module. The processing module compares a predetermined volume to an external volume when the communication module receives or dials a phone call and enters a communication mode. Wherein, the external volume is received by the volume-receiving module. When the external volume is greater than the predetermined volume, the processing module disables an input function of the input interface to lock a screen of the communication device.

In an embodiment of the present invention, the external volume is, for example, a user's volume received when the user performs a phone call in the communication mode. In another embodiment, the external volume can also be an environmental volume.

In an embodiment of the present invention, after the processing module receives an unlock signal, the processing module activates the input function of the input interface. The unlock signal can be a signal generated when the user presses a specific key of the communication device, a signal generated when the user presses a specific region on the input interface, or a signal generated when the user performs a specific slide operation on the input interface. The input interface can be a touch screen or a keyboard. Wherein, a type of a key on the keyboard comprise a letter key, a symbol key, a function key and a numeral key.

In an embodiment of the present invention, the processing module continually activates the input function of the input interface when determines that the external volume is less than or equal to the predetermined volume.

In an embodiment of the present invention, the communication device is, for example, a smartphone, a personal digital assistant (PDA) phone, or a touch phone.

In the present invention, whether the input function of the input interface is disabled is determined according to a loudness of the external volume received by the communication device under the communication mode. Accordingly, when the user cannot clearly hear a voice from another side of the communication device, and further approaches the communication device and talks loudly, unintended activation of other application programs due to that the input device is still maintained in an operational state can be avoided, so that the phone call can be smoothly carried through.

In order to make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Generally, when a communication device detects that a user's volume exceeds a certain decibels, it means that a distance between the user and the communication device is rather close, and meanwhile it means that the user is probably making a phone call. In this case, if an input function of an input interface of the communication device can be automatically disabled, a problem of a call-interruption due to unintended activation of other application programs by the user can be prevented. Therefore, the present invention provides a communication device and an auto-lock method thereof, and a computer-readable recording medium based on the above object. To fully convey the concept of the present invention, embodiments are provided below for describing the present invention in detail.

Figure 1:
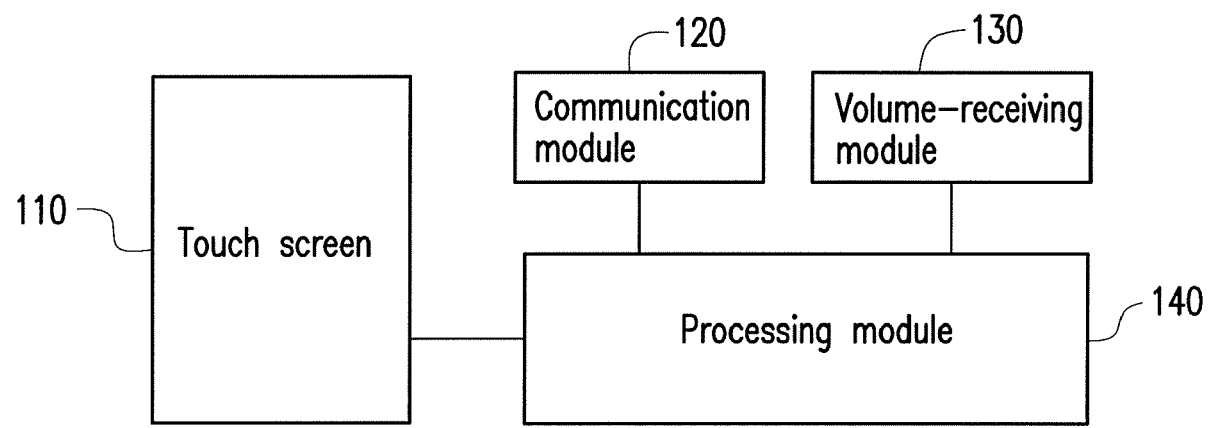
FIG. 1 is a block diagram illustrating a communication device according to an embodiment of the present invention.

For simplicity's sake, the input interface of the communication device is assumed to be a touch screen in the following embodiments. FIG. 1 is a block diagram illustrating a communication device according to an embodiment of the present invention. Referring to FIG. 1, the communication device 100 includes a touch screen 110, a communication module 120, a volume-receiving module 130 and a processing module 140. The communication device 100 can be a mobile phone, a PDA phone, a smartphone, a touch phone, etc, which is not limited by the present invention.

The touch screen 110 is not only used for displaying operation images of the communication device 100, but is also used for displaying menus, icons and a software input panel (SIP) to facilitate the user performing various operations such as an item selection or a character input, etc. Moreover, the user can answer or make a phone call through the communication module 120 of the communication device 100. The volume-receiving module 130 is used for receiving an external volume. The processing module 140 is respectively connected to the touch screen 110, the communication module 120 and the volume-receiving module 130, and is capable of automatically determining whether or not to disable the input function (i.e. a touch function) of the touch screen 110 according to a loudness of the external volume when the communication device 100 is in a communication mode.

Figure 2:
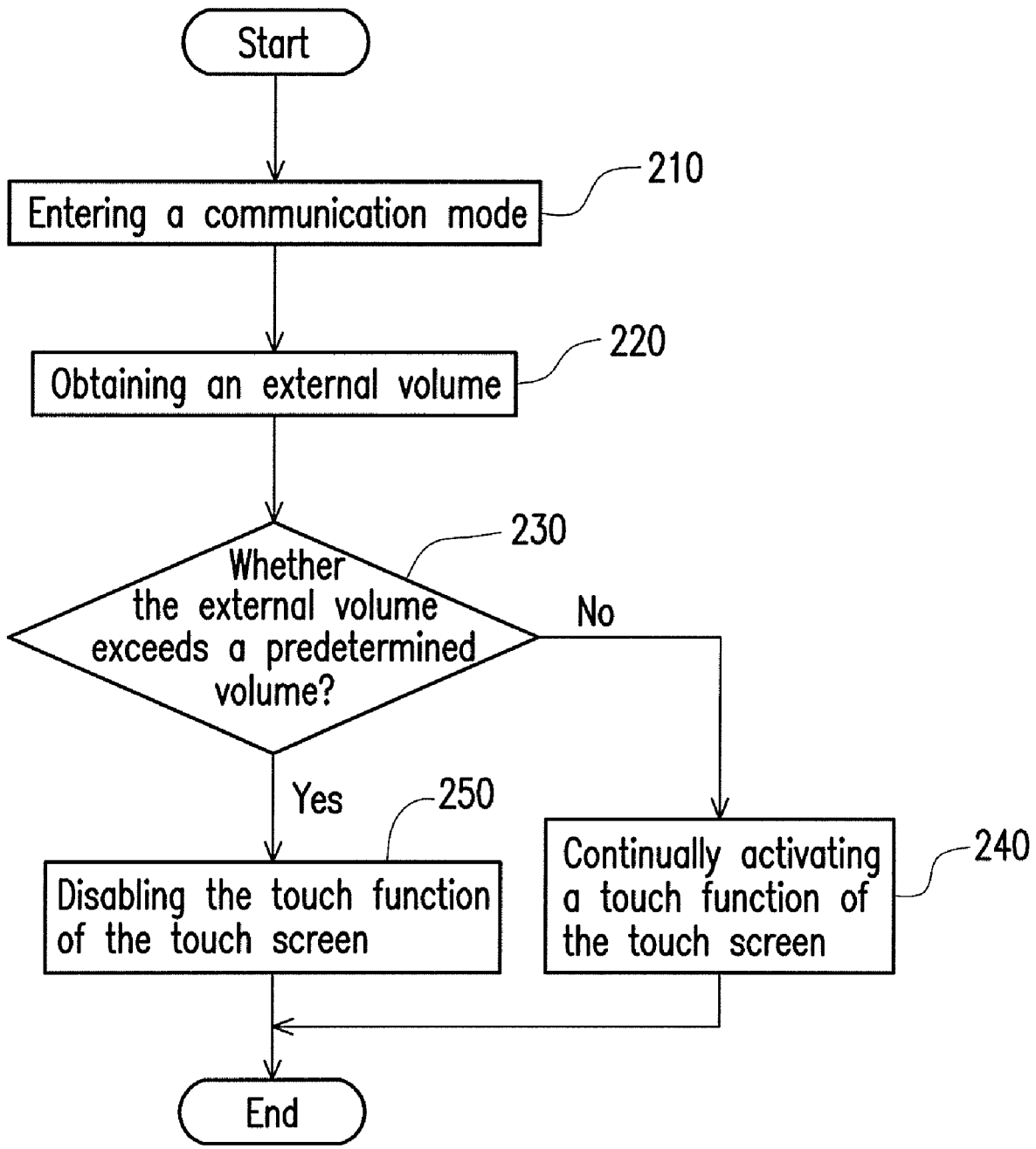
FIG. 2 is a flowchart illustrating an auto-lock method according to an embodiment of the present invention.

In the following embodiments, the present invention is described in detail with reference of the communication device 100. FIG. 2 is a flowchart illustrating an auto-lock method according to an embodiment of the present invention. Referring to FIG. 1 and FIG. 2, when the communication module 120 receives a calling signal, and the user determines to answer such calling, in step 210, the communication device 100 enters a communication mode.

Next, in step 220, the volume-receiving module 130 (for example, a volume sensor) determines an external volume currently received by the communication device 100. In an embodiment, the external volume can be a user's volume sent by the user when the user performs the phone call in the communication mode 100. In another embodiment, the external volume includes an environmental volume.

Next, in step 230, the processing module 140 compares the external volume to a predetermined volume to determine whether the external volume reaches the predetermined volume. If the external volume is less than or equal to the predetermined volume, it means that the user is in a good communication environment. In this case, the user does not need to talk loudly to send messages, so that the user is unnecessary to be excessively closed to the communication device 100 to perform the phone call. Therefore, in step 240, the processing module 140 continually activates the touch function of the touch screen 100.

However, when the user uses the communication device 100 in a relatively noisy environment, he/she may probably attach the communication device 100 to his/her face and talk loudly. Namely, if the external volume exceeds the predetermined volume, it can be caused by a relatively great environmental volume generated by the noisy environment, and can also be caused by the user's volume generated when the user cannot clearly hear a voice from the communication device 100 and further approaches the communication device 100. The above factors all lead to a result that the volume-receiving module 130 receives a relatively high decibel external volume. In either case, the user is probably rather closed to the communication device 100, and a possibility of unintended touch of the other function modules on the touch screen is increased. Therefore, in step 250, the processing module 140 automatically disables the touch function of the touch screen 100 to prevent the user miss-touching selection items or icons on the touch screen 110, so as to avoid interruption of the phone call due to activation of the other functions. In other embodiment, the processing module 140 just automatically turns off the screen to disable the touch screen.

It should be noted that though answering the phone call is taken as an example in the present embodiment, if the user initiatively makes a phone call, the input function of the input interface can also be automatically disabled according to the steps shown in FIG. 2. Namely, once the communication device 100 enters the communication mode, the processing module 140 can automatically compare the external volume to the predetermined volume, and if the external volume is greater than the predetermined volume, the touch function of the touch screen 100 is then automatically disabled. By such means, the user is then unnecessary to worry about unintended touch of the other functions, and interruption of the phone call due to the unintended touch of the other functions can be avoided.

Figure 3:
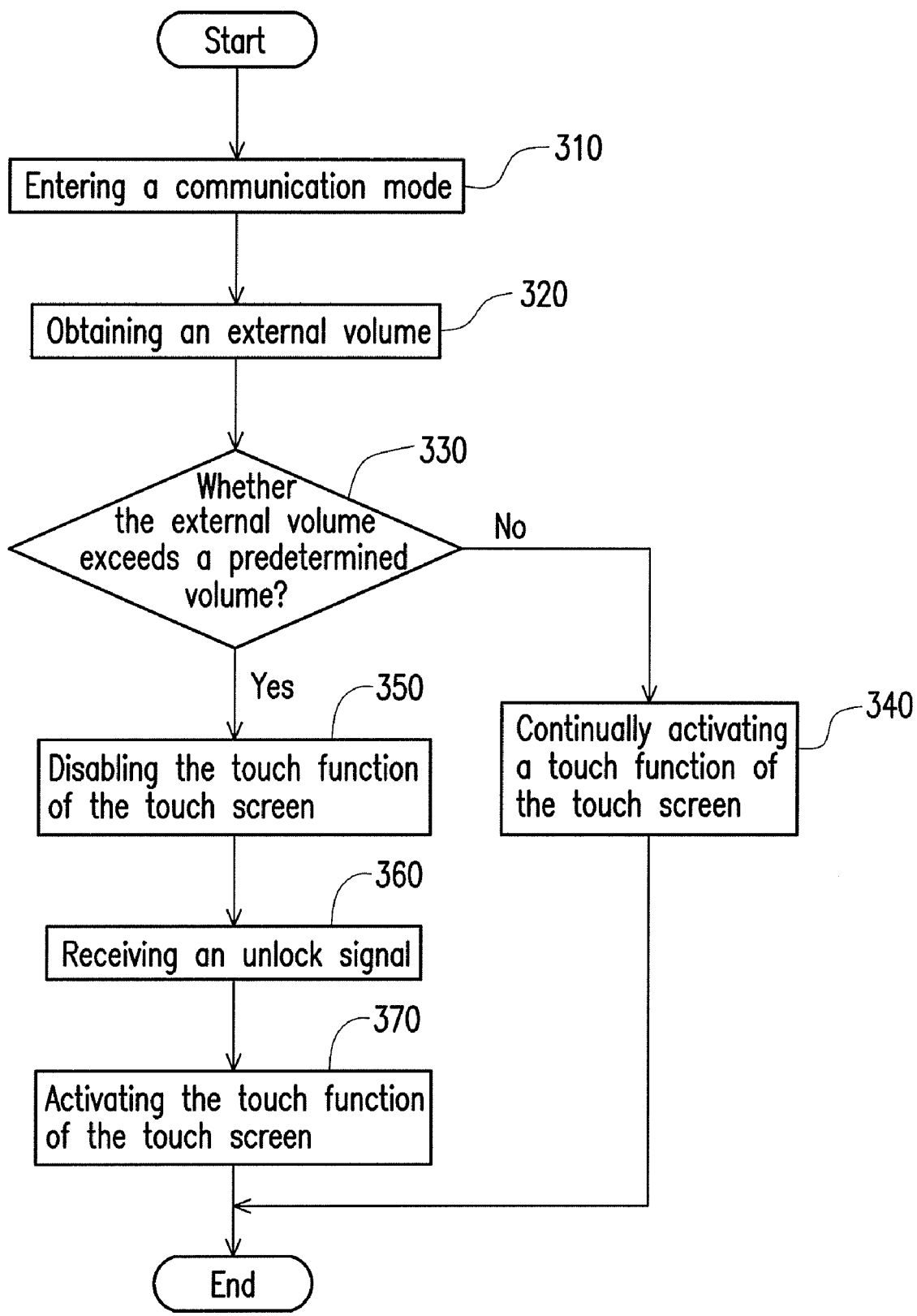
FIG. 3 is a flowchart illustrating an auto-lock method according to another embodiment of the present invention.

FIG. 3 is a flowchart illustrating an auto-lock method according to another embodiment of the present invention. Referring to FIG. 1 and FIG. 3, in the present embodiment, when the user performs the phone call through the communication device 100, the communication device 100 can automatically determine whether or not to disable the touch function of the touch screen 110 according to the loudness of the received external volume. Moreover, after the phone call is completed, the user can recover the touch function of the touch screen 100 by a simple action. Since the steps 310 to 340 of FIG. 3 are the same or similar to the steps 210 to 240 of FIG. 2, detailed descriptions thereof are not repeated.

In step 350 of FIG. 3, since the external volume received by the volume-receiving module 130 in the communication mode exceeds the predetermined volume, the processing module 140 disables the touch function of the touch screen 110. In other words, the user now cannot perform any operation to the communication device 100 through the touch screen 110.

After the phone call is completed, when the user wants to operate the communication device 100 via the touch screen 110, the user can, for example, press a predetermined specific key on the communication device 100 to input an unlock signal. Next, in step 360, the processing module 140 receives the unlock signal, and in step 370, the processing module 140 activates the touch function of the touch screen 110, so that the user can operates the communication device 100 through the touch screen 110.

It should be noted that the method for generating the unlock signal is not limited by the present invention. For example, the user can press a predetermined specific region on the touch screen 110 to generate the unlock signal, while in another embodiment, the user can also perform a specific slide operation on the touch screen 110 to generate the unlock signal. Once the communication device 100 receives the unlock signal sent by the user, the processing module 140 activates the touch function of the touch screen 110, so that the user can immediately operates the communication device 100 through the touch screen 110.

It should be noted that the aforementioned auto-lock method can be implemented on any communication device having the processing module and the touch screen. In other words, the aforementioned embodiment can be designed as a computer program comprising a plurality of program codes, and the computer program can be stored in a computer-readable recording medium (for example, a memory, a CD-ROM, or a hard disk). After the computer program is loaded to the communication device, the aforementioned auto-lock method is then executed on the communication device.

In the aforementioned embodiments, though the touch screen is taken as an example, regarding the communication device applying a keyboard (for example, formed by letter keys, symbol keys, function keys and numeral keys) as the input interface, the function of appropriately disabling the input function of the keyboard can also be achieved via steps similar to that shown in FIG. 2 or FIG. 3. Taking a mobile phone having the communication function and the keyboard with numeral keys as an example, when the user performs the phone call via the mobile phone, if the external volume reaches the predetermined volume, the input function of the keyboard is then automatically disabled. In other words, even if the user now miss-touches any key on the keyboard, the phone call is not influenced. By such means, interruption of the phone call due to miss-touch of the keyboard by the user can be avoided.

In summary, the communication device, the auto-lock method thereof and the computer-readable recording medium of the present invention have at least the following advantages:

1. Whether the input function of the input interface is disabled is determined according to the loudness of the received external volume in the communication mode. Therefore, the user is unnecessary to manually disable the input function of the touch screen or the keyboard, so that utilization convenience of the communication device is improved.

2. Regarding any communication device having the input interface, a judgement mechanism for automatically disabling the input function of the input interface is provided, so as to avoid the inconvenience caused by unintended activation of the other functions during the communication mode.

3. After the input function of the touch screen or the keyboard is disabled, the user can recover the input function of the above input interfaces by a simple action, so that a better usage feeling can be achieved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method, adapted to a communication device having an input interface, the method comprising:
   entering a communication mode of the communication device in response to receiving or dialing a phone call;
   determining a user's volume received by the communication device;
   comparing the user's volume to a predetermined volume in the communication mode;
   and disabling an input function of the input interface if the user's volume reaches the predetermined volume.

2. The method as claimed in claim 1, wherein after the step of disabling the input function of the input interface, the method further comprises:
   receiving an unlock signal; and
   activating the input function of the input interface.

3. The method as claimed in claim 2, wherein the unlock signal comprises at least one of a signal generated when a specific key of the communication device is pressed, a signal generated when a specific region on the input interface is pressed, and a signal generated when a specific slide operation is performed on the input interface.

4. The method as claimed in claim 1, wherein after the step of comparing the external user's volume to the predetermined volume, the method further comprises:
   continually activating the input function of the input interface if the user's volume is less than or equal to the predetermined volume.

5. A communication device, comprising:
   an input interface;
   a communication module, for receiving a phone call;

a volume-receiving module, for receiving a user's volume; and a processing module, coupled to the input interface, the communication module and the volume-receiving module, and used for comparing a predetermined volume to the user's volume when the communication module receives or dials the phone call and enters a communication mode, and disabling an input function of the input interface when the user's volume reaches the predetermined volume.

6. The communication device as claimed in claim 5, wherein after the processing module receives an unlock signal, the processing module activates the input function of the input interface.

7. The communication device as claimed in claim 6, wherein the unlock signal comprises at least one of a signal generated when a specific key of the communication device is pressed, a signal generated when a specific region on the input interface is pressed, and a signal generated when a specific slide operation is performed on the input interface.

8. The communication device as claimed in claim 5, wherein the processing module continually activates the input function of the input interface when the user's volume is less than or equal to the predetermined volume.

9. A computer-readable recording medium, for storing a program, wherein the program comprising a plurality of program codes that can be loaded into a communication device to execute an auto-lock method, and the method comprises when the communication device having an input interface enters a communication mode, determining a user's volume received by the communication device;

comparing the external volume to a predetermined volume; and disabling an input function of the input interface if the external volume reaches the predetermined volume.

10. The computer-readable recording medium as claimed in claim 9, wherein after the step of disabling the input function of the input interface, the method further comprises:

receiving an unlock signal; and activating the input function of the input interface.

11. The computer-readable recording medium as claimed in claim 10, wherein the unlock signal comprises at least one of a signal generated when a specific key of the communication device is pressed, a signal generated when a specific region on the input interface is pressed, and a signal generated when a specific slide operation is performed on the input interface.

12. The computer-readable recording medium as claimed in claim 9, wherein after the step of comparing the user's volume to the predetermined volume, the program further comprises:

continually activating the input function of the input interface if the user's volume is less than or equal to the predetermined volume.

* * * * *